April 10, 1951    R. E. FRISON    2,548,104
TAG AND CARD HOLDER
Filed Sept. 29, 1948

Inventor
ROBERT E. FRISON
By Lamphere and Van Valkenburgh
Attorneys

Patented Apr. 10, 1951

2,548,104

UNITED STATES PATENT OFFICE 2,548,104

TAG AND CARD HOLDER

Robert E. Frison, Buffalo, Wyo.

Application September 29, 1948, Serial No. 51,743

17 Claims. (Cl. 40—1.6)

This invention relates to tags and card holders for game licenses and the like, although the tag and card holder may be used together or individually for other purposes.

In the issuance of licenses for hunting game, such as deer, the license is usually issued as a card having separable parts. One of the parts shows that a license has been issued to the individual concerned, and the other part comprises a tag to be attached to the animal, such as a deer, after the hunter has made the kill. It is customary for hunters to make a slit in an accessible portion of the animal, such as in the ear, and attach the identifying tag thereto, as by means of string or wire. However, the tags so attached tend to become accidentally lost or detached from the animal, and also sometimes may be removed and used on other animals. The hunter is also customarily required to file a report on the kill, since it is necessary for the Fish and Game Commission, or equivalent authority, to keep records of the number of animals of various types killed during the hunting season.

Among the objects of this invention are to provide a novel tag for identifying game, or for other uses; to provide such a tag which, once attached to the animal, is locked and cannot be removed except by mutilation or destruction; to provide such a tag which can be conveniently carried until final use, with little danger of its becoming locked prior to such use; to provide a novel holder for a license or application card or the like; to provide such a holder which is particularly adapted to be used with the novel tag of this invention; to provide such a holder which can be used to issue several different tags, which may serve as licenses, and by which one or more tags can be carried prior to final use; to provide such a holder which is particularly adapted to cooperate with the novel tag of this invention, in permitting the tag to be mounted on the holder and thereby carried, but without locking, yet remain securely attached to the holder until used; and to provide such a holder and tag which are relatively simple in construction and economical to manufacture.

Other objects and the novel features of this invention will become apparent from the description which follows, taken in connection with the accompanying drawing, in which.

Figure 1:
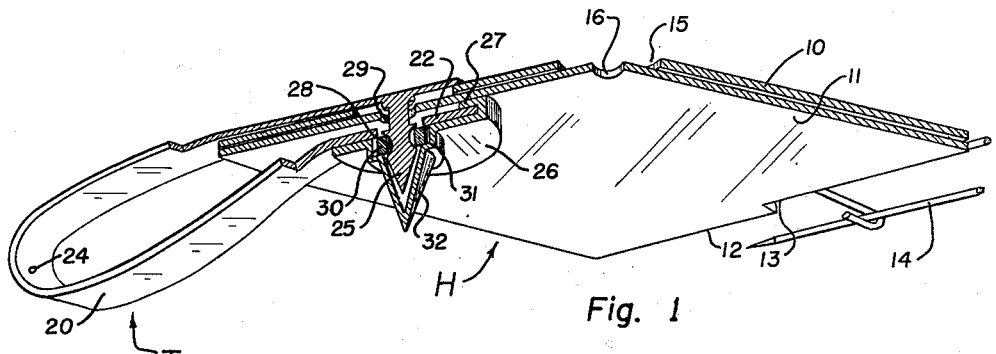
Fig. 1 is a three-dimensional rear view, partly in section, of a card holder and tag constructed in accordance with this invention, the tag being attached to the holder for carrying purposes.
Figure 2:
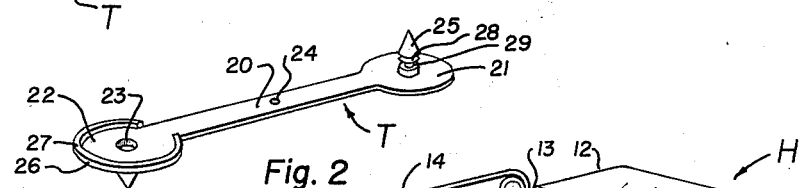
Fig. 2 is a three-dimensional rear view, on a reduced scale, of the tag in flat or open position.
Figure 3:
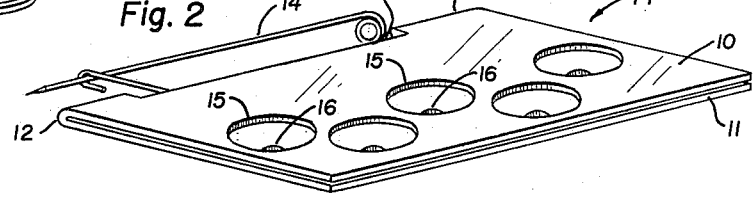
Fig. 3 is a three-dimensional front view, on a reduced scale, of the card holder.
Figure 4:
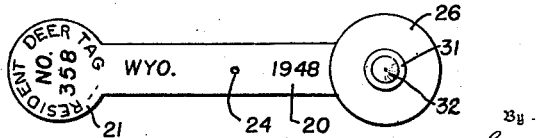
Fig. 4 is a top plan view of the tag in flat position.

As illustrated in Figs. 1–3, a holder H, which is adapted to carry one or more tags T, may comprise a sheet of transparent material, such as plastic, bent over upon itself to form two parallel sheets 10 and 11, connected together at one edge 12 and spaced only a slight distance apart, thereby forming a slot in which a license or application card may be inserted. The sheets 10 and 11 are preferably formed so as to clamp onto a card, to insure the card being retained therebetween. The edge 12, at which the sheets 10 and 11 are joined, may be provided with a slot 13, for reception of a pin 14, by which the holder may be fastened to the clothing of the hunter. The sheet 10 is provided with a plurality of apertures 15, preferably circular, while the sheet 11 is provided with a plurality of registering but smaller apertures 16, the apertures 15 and 16 providing holes for reception of the tag T. The card inserted within the sheets 10 and 11 of the holder may be an application card, having on one side the necessary affidavit, etc., and on the other side the necessary information relative to the holder thereof. Each tag T may comprise the license for, and carry an indication of, the serial number of the elk, deer, bear, antelope, fish, bird, etc. license issued to the individual, as in Fig. 4. The tags, such as the tag T, may be passed through an appropriate hole and fastened to the holder H. Preferably, each hole is appropriate for a particular license, and while the tag may serve as a license, the card may be filled out at the hole, when the tag is issued, to indicate the serial number, etc. of the particular license issued. Thus, the application card may be obtained when the first license is obtained, and other licenses and tags obtained subsequently. It will be understood, of course, that there are other ways of utilizing the holder and card, and the tag or tags in combination therewith.

When the tag T is passed through the card, it punches a hole therein, and when the holder and card are returned to the authority issuing the same, if the tag is still on the holder, it is an indication that no kill has been made, in the case of game which must be tagged, such as elk, deer, bear or antelope. However, if there is a hole in the card where the tag has been, it is indication that an animal has been killed. Thus, the holder and tag automatically record the desired information.

Figure 5:
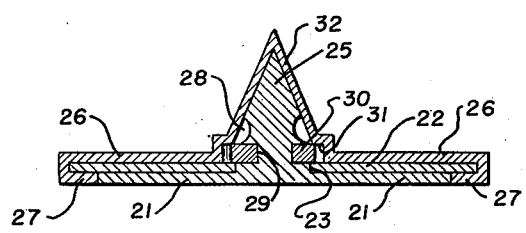
Fig. 5 is a lateral cross section, on an enlarged scale, of the tag in final locked position.

The tag T, as in Figs. 1 and 2, may comprise a strip 20 having at one end a circular portion 21 and at the opposite end a slightly larger circular portion 22, having a hole 23 in the center. The strip 20 may also have a central hole 24, by which a number of tags, in flat position as in Fig. 2, may be strung on wire or the like, for convenience in keeping. A pin 25, having a conical point, is attached to the circular portion 21, as by welding or riveting, while a receiver 26 for pin 25 is attached to the circular portion 22, as by a flange 27 bent or crimped over onto the circular portion 22. The shank of the pin 25 has an arcuate groove 28 and a square groove 29, the square groove being adjacent the circular portion 21. Each groove 28 and 29 is adapted to engage a locking ring or clip 30, disposed in a space provided between a shoulder 31 of receiver 26 and the circular portion 22, when the pin 25 is inserted through hole 23, the groove engaged depending on the distance the pin is inserted. The receiver 26 is also provided with a conical dome 32, into which the conical point of pin 25 may extend, as in Fig. 5. The serial number and type of license represented by the tag may be embossed or otherwise shown on the top of the tag, or outer surface of the circular portion 21, as in Fig. 4.

When the tag T is attached to the holder H, as in Fig. 1, the receiver 26 is placed over the smaller aperture 16 in sheet 11, while the pin 25 is passed through the apertures 15 and 16, from the front or opposite side of the holder. The thickness of the holder H prevents the pin from passing any farther than a predetermined distance, at which the locking ring 30 will snap into the arcuate groove 28, as in Fig. 1. In this position, the tag T is attached to the holder, but may be removed therefrom, since the arcuate form of the groove 28 permits the locking ring 30 to snap out of, as well as into, the same.

After the kill has been made, and a slit made in the ear or other accessible portion of the animal, the tag T is removed from the holder H, and the strip 20 inserted in the slit in the animal. The two ends of the tag T are then snapped together, to the position of Fig. 5, in which the locking ring 30 engages the square groove 29. In this position, the tag is locked on the animal, since any attempt to pry the two ends of the tag apart will not cause the locking ring to snap out of the groove, but will merely mutilate or destroy the tag. The flange 27 of receiver 26 extends only to the edges of the strip 20, so that the circular portion 21 will be received within the flange, as in Fig. 5, and that part of the strip adjacent circular portion 21 will lie between the ends of flange 27. Also, the lower edge of the square groove 29 is spaced from the circular portion 21 a distance substantially equal to the thickness of the circular portion 22, so that the parts will fit tightly together.

Figure 8:
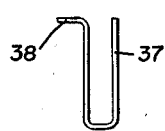
Figs. 6–9, inclusive, are plan views of different types of springs or clips which may be used in the tag.
Figure 7:
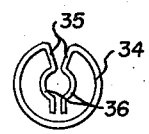
Figure 6:
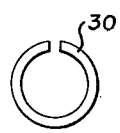
Figure 9:
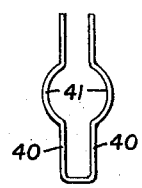

The locking ring or clip 30 is preferably made of square or rectangular stock, or at least has a square inner edge, and may be round, in the form of a split ring, as in Fig. 6. Or, it may have other shapes, such as illustrated in Figs. 7–9. Thus, the ends of a split ring 34 of Fig. 7 may extend inwardly to the center to provide arms 35 having central arcuate sections 36, to provide greater resiliency and easier attachment to and detachment from the holder H. Or, as in Fig. 8, the clip 37 may be square U-shaped, with or without a right angle finger 38. Or, as in Fig. 9, the clip may include a pair of parallel arms 40 having central arcuate sections 41. The shape and relative size of shoulder 31 on receiver 26 is preferably varied in accordance with the size and shape of the locking ring or clip.

From the foregoing, it will be evident that the tag and card holder of this invention fulfill to a marked degree the requirements and objects hereinbefore set forth. The tag and holder are very convenient to be carried around together, and there is no danger of the tag becoming lost until used on the animal. The tag, while securely attached to the holder, may be detached therefrom, but when finally attached to the animal, it is locked and cannot be removed without mutilation and destruction. The use of the holder to provide sufficient thickness to prevent the full insertion of the pin of the tag into the receiver, is a particularly novel and valuable feature of cooperation between the holder and the tag. The provision of two locking steps, the first being temporary and the second being permanent, is particularly valuable, since it permits the tag to be attached to a carrier, such as the holder, without danger of becoming fully locked until removed from the holder for final use. The provision of two locking grooves, one of which locks temporarily and the other permanently, in combination with a resilient locking ring, are specific features which enable the tag to be used in the manner described.

It will be understood that the specific construction illustrated and described may be varied within relatively wide limits. Thus, different materials and different arrangements of the parts may be utilized, as may also the shape and configuration of the parts be varied. The variations of the locking ring or clip illustrated are indicative of the variations which may be made in the pin and receiver. Thus, instead of conical, the end of the pin may be pyramidal or have other tapering shapes, with the receiver dome preferably having a similar shape. Also, the circular portion at each end of the strip may be omitted, if desired, and other ways of attaching the receiver to the strip, as by brazing or the like, may be utilized. The pin and/or portions of the receiver may be made integrally with the strip, while a flange to attach the receiver to the strip may be formed on the strip itself, rather than on the receiver. The tag may also be used for other purposes, as for attachment to receptacles to indicate whether the same has been opened or tampered with.

The tag may also be attached to the holder by insertion of the pin through the holder from the opposite direction, and the holder may be so constructed that only one sheet prevents the tag pin from moving to locked position. The tag may also be used with a holder formed of only one sheet, or a special ring or washer may be used to prevent the tag from locking until used.

It will thus be understood that other embodiments may exist, and various changes made therein, all without departing from the spirit and scope of this invention.

What is claimed is:

1. A tag or the like, comprising a strip having adjacent one end a pin and adjacent the opposite end a receiver for said pin, said pin being insertable in said receiver and said pin and receiver having cooperating attaching and locking means constructed and arranged so that said pin is removably attached to said receiver when inserted therein a predetermined distance and locked in said receiver when inserted therein a further predetermined distance in the same direction.

2. A tag or the like, comprising a strip having adjacent one end a pin and adjacent the opposite end a receiver for said pin, said pin being insertable in said receiver and said pin and receiver having cooperating attaching and locking means, including a spring clip in said receiver and differing grooves on said pin, constructed and arranged so that said pin is removably attached to said receiver by engagement of said clip with one said pin groove when inserted therein a predetermined distance and locked in said receiver by engagement of said clip with a differing groove when inserted therein a further predetermined distance in the direction of the axis of said pin.

3. A tag or the like, as defined in claim 2, wherein said locking means includes a round, split ring spring clip having a rectangular cross-section.

4. A tag or the like, as defined in claim 2, wherein said locking means includes a U-shaped spring clip having a rectangular cross-section.

5. A tag or the like, as defined in claim 2, wherein said locking means includes a spring clip having two arms with concave portions disposed centrally thereof.

6. A tag or the like, as defined in claim 5, wherein said clip includes an outer split ring, from the ends of which said arms extend.

7. A tag or the like, comprising a strip having adjacent one end a pin and adjacent the opposite end a receiver for said pin, said pin being insertable in said receiver, said pin having two grooves of different shape and said receiver having a cooperating spring clip, constructed and arranged so that said pin is removably attached to said receiver by engagement of said clip with one said groove when inserted therein a predetermined distance and locked in said receiver by engagement of said clip with the other said groove when inserted therein a further predetermined distance in the same direction.

8. A card holder and tag for a license or the like, comprising two parallel, transparent sheets, closely spaced to contain a card therebetween; at least one aperture in each sheet, registering with an aperture in the opposite sheet; and a strip having adjacent one end a pin and adjacent the opposite end a receiver for said pin, said pin being insertable in said receiver and said pin and receiver having cooperating attaching and locking means constructed and arranged so that said pin is removably attached to said receiver when inserted therein a predetermined distance and locked in said receiver when inserted therein a further predetermined distance, at least one of said sheets limiting the movement of said pin into said receiver when said pin extends through registering apertures.

9. A tag or the like, comprising a strip; a pin extending from one end of said strip, said pin having a conical point, an arcuate groove extending therearound, and a rectangular groove extending therearound between said arcuate groove and said strip; a receiver for said pin on the opposite end of said strip, said opposite end having a central hole through which said pin may extend, said receiver including a locking clip adapted to removably attach the ends of said strip when said pin is inserted in said receiver until said ring engages said arcuate groove, and also adapted to lock the ends of said strip together when said pin is inserted in said receiver until said ring engages said rectangular slot.

10. A tag or the like, as defined in claim 9, wherein said locking clip is circular and is made of square stock.

11. A tag or the like, comprising a strip having at each end a circular portion, one circular portion being smaller than the other; a pin extending centrally from the smaller circular portion, said pin having a conical point, an arcuate groove extending therearound, and a rectangular groove extending therearound between said arcuate groove and said strip, the nearer edge of said rectangular groove being spaced from said strip a distance equivalent to the thickness of said larger circular portion and said larger circular portion having a central hole through which said pin may extend; a receiver having a flange clamped around the edges of said larger circular portion, a conical dome adapted to receive the conical point of said pin, and a shoulder at the large end of said dome; and a locking ring disposed in the space between said shoulder and said larger circular portion; said locking ring having a rectangular cross section and being adapted to removably attach the ends of said strip when said pin is inserted in said receiver until said ring engages said arcuate groove, and also adapted to lock the ends of said strip together when said pin is inserted in said receiver until said ring engages said rectangular groove.

12. A license device comprising a tag as defined in claim 11 in combination with a holder for a card, said holder including two parallel, transparent sheets, connected together at one edge and closely spaced to contain a card therebetween, said connecting edge having a slot therein; a pin for attaching said holder to clothing or the like and mounted on said holder at said slot; a plurality of circular apertures in one sheet; a plurality of larger circular apertures in the other sheet, each registering with an aperture in the opposite sheet; and the pin of said tag being insertable through registering apertures, the thickness of said holder preventing said tag pin from extending into said recess farther than a position in which said locking ring engages said circular groove, whereby said tag may be removably attached to said holder and said tag pin extend through said card to leave a hole therein when removed.

13. A license device or the like, comprising the combination of a relatively flat card holder having at least one aperture therethrough and a tag having a connecting and locking pin insertable through said aperture, said tag including a strip having said pin at one end and at the other end a receiver for said pin, said pin being insertable in said receiver and said pin and receiver having cooperating attaching and locking means constructed and arranged so that said pin is removably attached to said receiver when inserted therein a predetermined distance and locked in said receiver when inserted therein a further predetermined distance, and the thickness of said card holder being proportioned to the distance moved by said pin into said receiver to said removably attached position, so that when said pin is passed through said aperture and then into said receiver, said pin will move only to said removably attached position.

14. A license device or the like, as defined in claim 13, wherein said pin is provided with longitudinally spaced grooves and said receiver is provided with a cooperating spring clip, the outer of said grooves being constructed so as to be releasably engaged by said spring clip, and the inner of said grooves being constructed so as to be locked by said spring clip when in engagement therewith.

15. A license device or the like, as defined in claim 14, wherein said receiver is attached to said strip so that mutilation of said receiver is necessary to disengage said pin from said receiver when in said locked position.

16. A tag or the like, comprising a strip; a pin extending from one side of said strip, said pin having a tapering point and longitudinally spaced grooves of different shape extending therearound, a first groove adjacent said point having a shape providing releasable engagement with a member engaging said groove in a lateral direction and a second groove spaced from said point farther than said first groove and having a shape providing locking engagement with said member; a receiver for said pin on the opposite end of said strip, said opposite end having a hole through which said pin may extend; and a locking clip in said receiver positioned to engage said pin when extending through said hole, said clip and pin removably attaching the ends of said strip when said pin is inserted in said receiver until said clip engages the first said groove and locking the ends of said strip together when said pin is inserted in said receiver until said clip engages the second said groove.

17. A tag or the like, comprising a strip; a pin extending from one end of said strip, said pin having a tapering point, and longitudinally spaced grooves of different shape extending therearound, a first groove adjacent said point having a shape providing releasable engagement with a member engaging said groove in a lateral direction and a second groove spaced from said point farther than said first groove and having a shape providing locking engagement with said member; a receiver having a flange clamped around the edges of the opposite end of said strip; a dome adapted to receive the point of said pin, and a shoulder at the large end of said dome; and a locking ring disposed in the space between said shoulder and said strip, said locking ring having a rectangular cross section and positioned to engage said pin when extending into said receiver, said ring and pin removably attaching the ends of said strip when said pin is inserted in said receiver until said ring engages said first groove, and locking the ends of said strip together when said pin is inserted in said receiver until said ring engages said second groove.

ROBERT E. FRISON.

REFERENCES CITED

The following references are of record in the file of this patent:

UNITED STATES PATENTS

| Number | Name | Date |
| --- | --- | --- |
| 328,823 | Spruce | Oct. 20, 1885 |
| 417,941 | Radcliffe | Dec. 24, 1889 |
| 942,315 | Elliott | Dec. 7, 1909 |
| 961,069 | Crudginton | June 7, 1910 |
| 1,300,586 | Carr | Apr. 15, 1919 |
| 1,313,458 | Boyler | Aug. 19, 1919 |
| 2,095,481 | Skopec | Oct. 12, 1937 |
| 2,441,002 | Berglund | May 4, 1948 |